US012368743B2

(12) United States Patent
Lesperance et al.

(10) Patent No.: US 12,368,743 B2
(45) Date of Patent: Jul. 22, 2025

(54) COMPUTER SECURITY SYSTEM WITH RULES ENGINE FOR NETWORK TRAFFIC ANALYSIS

(71) Applicant: Target Brands, Inc., Minneapolis, MN (US)

(72) Inventors: Adam Lesperance, Minneapolis, MN (US); George Jenkins, Minneapolis, MN (US); Annalise Pucel, Minneapolis, MN (US); Andrew Orr, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 325 days.

(21) Appl. No.: 18/089,214

(22) Filed: Dec. 27, 2022

(65) Prior Publication Data

US 2023/0239315 A1 Jul. 27, 2023

Related U.S. Application Data

(60) Provisional application No. 63/302,417, filed on Jan. 24, 2022.

(51) Int. Cl.
*H04L 9/40* (2022.01)
*H04L 41/22* (2022.01)
*H04L 41/0604* (2022.01)

(52) U.S. Cl.
CPC .......... *H04L 63/1425* (2013.01); *H04L 41/22* (2013.01); *H04L 63/1416* (2013.01);
(Continued)

(58) Field of Classification Search
None
See application file for complete search history.

(56) References Cited

U.S. PATENT DOCUMENTS 6,959,323 B1 10/2005 Tzeng et al.
9,407,509 B2 8/2016 Porras et al.
(Continued)

FOREIGN PATENT DOCUMENTS

CN 104067281 A * 9/2014 .......... G06F 11/3476
CN 104468191 A * 3/2015
(Continued)

OTHER PUBLICATIONS

Ada Gavrilovska, Sanjay Kumar, Karsten Schwan; (The Execution of Event-Action Rules on Programmable Network Processors); pp. 8; Published on May 2004.*

*Primary Examiner* — Ali H. Cheema
(74) *Attorney, Agent, or Firm* — Barnes & Thornburg LLP

(57) ABSTRACT

In an implementation, a method for execution of security rules on a data network is described. The method includes steps of: sensing operations of the data network; generating event objects that record the operations of the data network; storing an event-timestamp that records a first time at which the operations were sensed; storing the event objects in a bulk-memory; storing a reception-timestamp that records a second time at which an event object was received for storage; identifying at least one security-rule to be run on matching event objects, the at least one security-rule specifying a time-length; identifying a time-window having a beginning-time before the event-timestamp and an end-time after the event-timestamp; generating an alert based on the run of the at least one security-rule on the matching event objects; and performing one or more security actions based on the alert to reduce an impact of a security threat.

15 Claims, 5 Drawing Sheets

(52) U.S. Cl.
CPC ...... *H04L 41/0622* (2013.01); *H04L 63/0263* (2013.01); *H04L 63/1408* (2013.01); *H04L 63/20* (2013.01)

(56) References Cited

U.S. PATENT DOCUMENTS

| | | |
|---|---|---|
| 10,061,807 B2 | 8/2018 | Marquardt et al. |
| 10,171,635 B2 | 1/2019 | Alves et al. |
| 10,229,150 B2 | 3/2019 | Marquardt et al. |
| 2002/0046273 A1 | 4/2002 | Lahr et al. |
| 2002/0087743 A1 | 7/2002 | Givoly |
| 2003/0200165 A1* | 10/2003 | Nielsen ................. G06Q 40/06 705/36 R |
| 2004/0024807 A1 | 2/2004 | Cabrera et al. |
| 2011/0072442 A1* | 3/2011 | Abdelhadi .............. H04L 41/00 719/318 |
| 2014/0351180 A1* | 11/2014 | Canoy .................... G06N 20/00 706/12 |
| 2021/0224051 A1* | 7/2021 | Bequet ................ G06F 9/45533 |
| 2021/0306338 A1* | 9/2021 | Miriyala ............... H04L 63/101 |
| 2023/0188526 A1* | 6/2023 | Miriyala ............... H04L 63/101 726/27 |
| 2024/0320231 A1* | 9/2024 | Bhattacharjee ....... G06F 9/5066 |

FOREIGN PATENT DOCUMENTS

| | | | | |
|---|---|---|---|---|
| CN | 111367781 A | * | 7/2020 | .......... G06F 11/3024 |
| CN | 108369646 B | * | 10/2021 | .......... A63B 24/0003 |
| CN | 113472729 A | * | 10/2021 | .......... G06F 21/6209 |
| JP | 2005346703 A | * | 12/2005 | .......... H04L 41/0604 |

* cited by examiner

COMPUTER SECURITY SYSTEM WITH RULES ENGINE FOR NETWORK TRAFFIC ANALYSIS

CROSS-REFERENCE TO RELATED APPLICATIONS

This application claims the benefit of U.S. Application Ser. No. 63/302,417, filed on Jan. 24, 2022. The disclosure of the prior application is considered part of (and is incorporated by reference in) the disclosure of this application.

TECHNICAL FIELD

The present document generally relates to computer network security, such as monitoring for and identifying potentially malicious network traffic.

BACKGROUND

Network security includes policies, practices, and devices adapted to monitor and prevent unwanted access, misuse, modification, or attacks on computer networks and network-accessible resources. Network security can involve differentiating and restricting between authorized and unauthorized access to data and services in a network, which can be controlled by one or more authentication schemes. Malicious actors are users that are not authorized to access the network (or particular data and resources of the network) but who nevertheless attempt to circumvent the network's implemented security controls in order to gain access to the network, either by thwarting network security measures or circumventing them by, for example, getting an authorized user to unwittingly perform actions that provide malicious actors with access. For example, malicious actors may either directly attempt to thwart network security measures, such as through an arbitrary execution exploit, or indirectly attempt to gain access through an authorized user, such as through a phishing scheme.

Network security can include proactive and reactive security measures that either block security threats before they exploit a security vulnerability (proactive security measure), or the security measures are deployed once the vulnerability has been exploited to mitigate the exploit (reactive security measure). Such proactive and reactive security measures can be performed automatically and/or manually, such as by security analysts who are experts in identifying and eliminating security threats in a network. Security analysts can perform a variety of tasks, such as investigating potential security vulnerabilities and instances of potential malicious attacks, differentiating between benign and malicious network activity, and formulating response strategies when malicious attacks are found.

SUMMARY

This document generally describes computer systems, processes, program products, and devices for the rapid and automated collection, storage, and analysis of large amounts of network events to provide improved and enhanced security analysis. For example, while single network events (e.g., network connection request, network data transmission) may themselves be indicators of potential security threats, oftentimes more sophisticated security threats may only be detectable by analyzing a group of network events to identify the security threats. However, in systems that have large volumes of network events, such as a large enterprise with a variety of different devices, users, and tie-ins to third party services, attempting to select and analyze the right groups of network events to identify security threats can be computationally challenging, particularly when the groups of network events that may be required to identify a security threat are spread over time. For example, if a cybersecurity system caches all network events for analysis, the storage capacity required for the cybersecurity system would be impracticably large and then searching across such an immense data set would consume excessive computing resources (i.e., memory read/write operations, CPU cycles). However, if a time window of network events are not retained for analysis, then the context across a group of network events that are used to identify security threats may be lost and the security threat may go undetected. The disclosed technology in this document provides a solution to these and/or other cybersecurity problems by providing systems, devices, and processes to retain appropriate and useful contexts for select network events without having to cache all network events—threading the needle between effectiveness in detecting security threats and minimizing the computing resources required to do so.

The disclosed technology can provide these benefits using any of a variety of features. For example, the system can include an extensible framework for instances of worker processes in computing hardware that operate to run rules on event data objects created by network telemetry. The arrangement of the system can allow for the graceful handling of event data objects received out of order and delayed, which can permit for appropriate contexts for groups of network security events to be maintained in spite of variation in the transmission and receipt of network events by the system. For example, multiple timestamps on every event data object—one for when the event occurred and one for when a record of the event is received—can be maintained and used by the system is to appropriately determine caching, grouping, and analysis of network events to provide an up-to-date context of events (i.e., timeline of events) even when new events are received for older time periods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for execution of security rules on a data network. The system includes a data network configured to pass data messages between hosted devices. The system also includes a plurality of network sensors configured to: sense operations of the data network; responsive to sensing the operations of the data network, generate event objects that record the operations of the data network; and store, in each event object, an event-timestamp that records a first time at which the operations were sensed. The system also includes a datastore configured to: store the event objects in a bulk-memory; and store, for each event object stored in the bulk-memory, a reception-timestamp that records a second time at which the event object was received for storage. The system also includes a rules-scheduler configured to: identify at least one security-rule to be run, the security-rule specifying a time-length; identify a time-window having a beginning-time before the event-timestamp and an end-time after the event-timestamp; and cause the security rule to be run on the matching event objects that i) each have an event timestamp after the beginning-time and before the end-time and ii) are each associated with the security-rule. Other embodiments of this aspect include corresponding computer systems, apparatus, and computer programs recorded on one or more computer storage devices, each configured to perform the actions of the methods.

Implementations may include one or more of the following features. The system where to cause the security rule to be run on the matching event objects, the rules-scheduler is further configured to: store, to an operation queue, instructions to run the security rule on the matching event objects; and the system further may include a plurality of rule-workers, each rule-worker configured to: identify the instructions to run the security rule in the operation queue; access, from a security-cache, event objects that i) each have an event timestamp after the beginning-time and before the end-time and ii) are each associated with the security-rule; run the security rule on the accessed event objects; and cause an alert with information about the run of the security rule on the new event object and on the additional event objects to be created. Colon> to cause the alert with information about the run of the security rule on matching objects to be created, each rule-worker is configured to: instruct an event generator to generate an event based on the run of the security rule on matching event objects; and the system further may include an alert generator configured to: receive the instruction to generate an alert based on the run of the security rule on the matching event objects; determine if a duplicate alert was already created; and responsive to determining that a duplicate alert was not already created, generating and transmitting the alert with information about the run of the security rule on the new event object and on the additional event objects. The system the system may include a display-device rendering information about the alert in a graphical user interface (gui) to a user of the display device. The data network is further configured to perform one or more security actions based on the alert to reduce the impact of a security threat that caused the operations of the data network recorded in the new event object. The security action is one of the group may include of i) quarantining one of the hosted devices, ii) logging data messages of one of the hosted devices, and iii) applying packet analysis to data messages of one of the hosted devices. Colon> the bulk-memory, compared to the security-cache, has slower access time and has greater storage capacity; the bulk-memory may include a an access-cache separate from the security cache-the access-cache configured to hold results of recent queries for a temporary amount of time and at a faster access time than the bulk-memory; and the datastore is configured to respond to new queries to the bulk-memory with results from the access-cache when the access-cache stores data responsive to the new queries. Implementations of the described techniques may include hardware, a method or process, or computer software on a computer-accessible medium.

Implementations can include any, all, or none of the following features.

The systems, devices, program products, and processes described throughout this document can, in some instances, provide one or more of the following advantages. This technology can solve problems common to very large computer networks and the security systems that monitor them. For example, a network spread out over large geographic areas can log network activity, but transmitting those logs can be unreliable in terms of network delay and message ordering. This technology allows for the analysis, and reanalysis, of this data as it is received. Use of a dual-timestamp arrangement can ensure that the security system is able to account for both the time that a network event occurred and also the time that the event information was received by the security system. As the difference between these times can vary based on, among other things, the state of a network under malicious attack, this scheme can provide greater security by allowing the security system to operate under the very conditions that it is meant to protect against—outages, lag, and unpredictable network traffic. This can ensure greater security and greater record keeping for post-mortem analysis after a security event.

Other features, aspects and potential advantages will be apparent from the accompanying description and figures.

DESCRIPTION OF DRAWINGS

Like reference symbols in the various drawings indicate like elements

DETAILED DESCRIPTION

A network security system can record timestamps for when events occur as well as timestamps for when the events are received by the security system. This can allow for creation of a reconstructed chronology of events even when the events are received out of order and much later than when the events take place. This can allow for efficient security operations even in very large networks with many hosted machines spread over large geographic areas.

Figure 1:
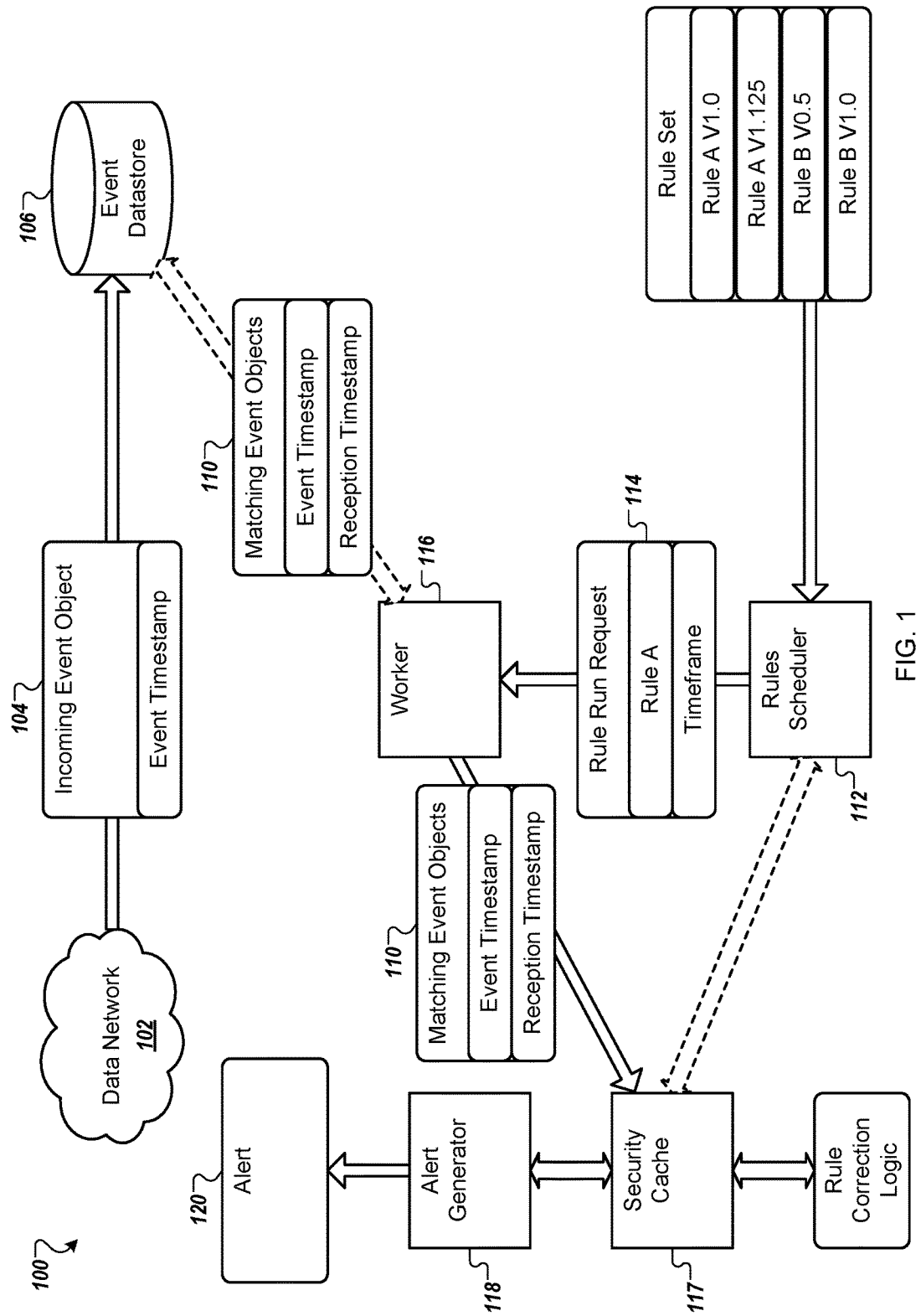
FIG. 1 shows an example system for running security rules on a data network.

FIG. 1 shows an example system 100 for running security rules on a data network 102. In the system 100, a data network 102 hosts devices such as desktops, laptops, cellular telephones, servers, and other computing devices that send and receive data. Operations on the data network 102 create events such as new packets placed on the network, devices attached or removed to the network, changes in user permissions, etc. These events create event objects 104 that record details about the events. For example, the event objects 104 can include addressing information of the sending and receiving device, static details that record or describe the data of a message on the network, dynamic details that record or describe the result of testing performed on one or more messages, etc. An event timestamp in the event object 104 can record a time at which the event occurred in the network 102.

An event datastore 106 can store the event objects 104 after they are created. For example, the event datastore 106 may be hosted on the data network 102 or may be on a separate network and used by security systems to monitor the data network 102 and perform security operations on the data network that maintain the integrity of the data network 102. The datastore 106 can store event objects 104 that have been updated to event objects 106 to include a reception timestamp. In many cases, the data network 102 can generate many events 104, and the events 104 may reach the event datastore 106 after variable delays and out of order. As such, a sequence of event objects 106 ordered by event timestamp is unlikely to also be in order by reception timestamp.

A rules scheduler 112 can identify one or more rules to be run on the events 104 received by the system 100. The rule scheduler 112 may operate on a clock-based schedule, running various rules at various times or periodicity based on the definitions of the rules, the availability of computing resources, or based on other input.

In some cases, the rules scheduler 112 may operate only on the clock-based schedule. In some other cases, the rules scheduler 112 may run rules based on reception of incoming events 104. For example, the event datastore 106 may include an interface that publishes a notification when a new event object 104 is stored, and the rules scheduler 112 can subscribe to this interface to receive the notifications. When the rules scheduler 112 receives notification of a new event object 106, the rules scheduler 112 can access a ruleset 114 that defines security rules that should be run on the event objects 106.

The ruleset used by the rules scheduler 112 can include a variety of rules, including old versions and test versions of rules. The rules scheduler 112 can identify one or more rules in the ruleset 114 that should be run. For example, the rule may call for examining messages from an IP subdomain (e.g., because the rule author believes this is tied to a malware command-and-control network), and may call for examination of event objects 110 that match a parameter of the rule (e.g., specifying source IP addresses within the subdomain). In such cases, the rules scheduler 112 can call for collection of matching event objects 110 (which can include event objects 110 that have never been analyzed with this and previously analyzed event objects 110 that have been analyzed with this rule at least once) out of a security cache 116.

For example, the rule may specify a count of events within a given time window that all originate from the IP subdomain. Within that time window, the network 102 may receive five such messages, creating five incoming event objects 104 with event timestamps close to each other. However, due to network latency, hardware failure, or other technical limitations of the data network 102, only four of the event objects 104 arrive promptly at the event datastore 106. The fifth event object 104 is delayed. During that delay, the rules scheduler 112 can schedule the rule to be run on the four matching event objects 110 that are available. However, in this example the rule specifies an alert only if there are five or more events in the time window. After the delay, the fifth event object 104 is received by the event datastore 106 and converted to an event object 110 with both an event timestamp and a reception timestamp. After this happens, the rules scheduler 112 can initiate the same rule for the same time window. As such, the rule will be run on all five event objects 110, which would trip the rule to cause an alert to be generating informing that the data network 102 might be under attack. Of note is that this configuration allows for an advantageous solution to the technical problem of event objects arriving out of order and/or delayed.

Once the rules scheduler 112 determines that a rule should be run, the rules scheduler 112 can transmit a rule run request 114 to a worker 116. The run request can include, or include reference to, the incoming event object 106 and any related previously analyzed event objects 116 needed to run the rule. The worker 116 can run the rule and then take one or more actions based on the result of the run.

If the rule calls for an alert (e.g., the rule specifies an alert should be made if there are five events 110 within a time window, and the worker identifies five such events 110), the worker 116 can generate and transmit the matching event objects 118 to a security cache 118. Of note is that the worker 116 is transmitting the same collection of matching event objects 110 as it used to analyze the rule. However, in other configurations, the worker 116 may be configured (e.g., based on the specification of a rule) to pass only some, but not all (i.e. a proper subset), of the matching event objects 110 used to analyze a rule. If the rule does not call for an alert (e.g. the rule specifies an alert only if the five events are sent to the same destination and the matching events 110 do not include five such events), the worker 116 can finish running the rule without sending the events 110 to the security cache.

In addition, the worker 116 can take one or more operations regardless of the outcome of the run of the rule. For example, the worker 116 can decorate the matching event objects 110, generate a report detailing why or how the rule was tripped, etc. Other details such as the result, or metadata of, the run can also be stored in the security cache, and the worker 116 can also take other actions with other elements of the system 100 or other systems.

An alert generator 118 can identify alert data stored in the security cache 116 by running rule correlation logic, for example, that has been recorded in stored procedures accessible to the alert generator 118. The alert generator 118 can query for new alerts and send those new alerts 120 out to external systems. This can include marking sent alerts as being sent, for example to avoid duplicate alert creation.

In addition, the alert generator 118 can use functionality to monitor alerts for high-priority situations. One example includes many alerts being generated at once due, for example, to a concentrated and successful attack on the data network 102. Such an attack can create many events 104 that match rules, indicating a dangerous situation with the network 102. In this case, one or more automated actions may be taken by the alert generator 118. In some cases, this can include sending higher-priority alerts 120, issuing direct commands to the data network 102, and disabling the rule for a period of time. It will be appreciated that many alerts 120 with redundant information may flood the external systems consuming the alerts 120, and therefore pausing the generation of those alerts 120 may be beneficial technologically.

This configuration of the system 100 can allow for a number of advantageous technological solutions to technological problems. For example, instead of a single worker 116, the system 100 may adaptively instantiate and deprecate workers 116 as load demands. With the workers 116 instantiated from a single virtual machine definition or hosted application, sufficient workers can be instantiated to ensure minimum throughput of the system 100 even when the volume of incoming event objects 104 and rule run requests 114 is very high. Similarly, when the hardware hosting or more workers unexpectedly fails, other identical workers 116 can be instantiated on other hardware hosts. And when demand is lower, some of the workers 116 can be suspended or terminated, lower the computational load when the volume of work does not demand it.

Figure 2:
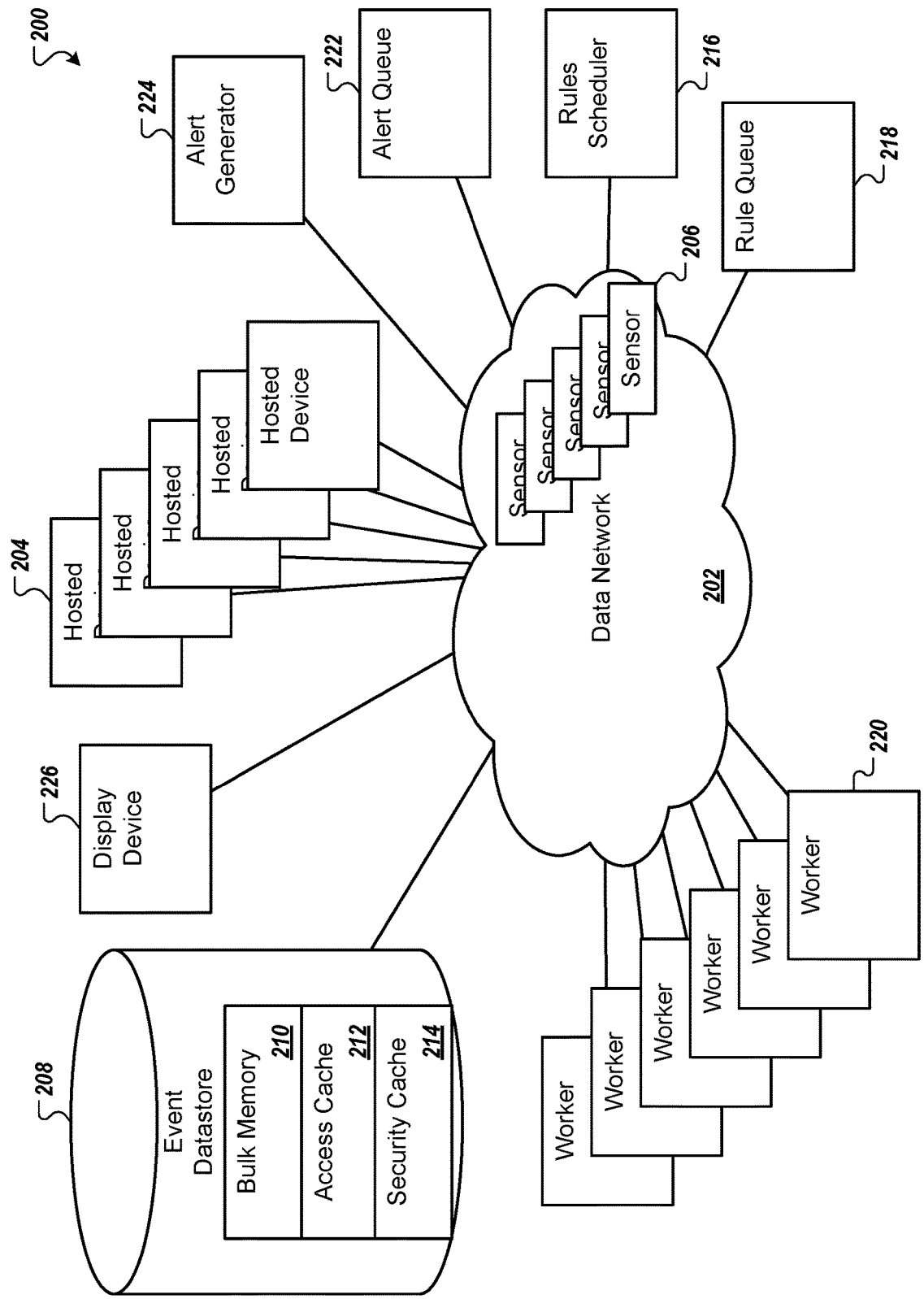
FIG. 2 shows an example system with components for running rules on a data network.

FIG. 2 shows an example system 200 with components for running rules on a data network. For example, the system 200 can be used to provide the operations described with reference to FIG. 1 and to execute security rules of a data network.

The system 200 includes a data network 202 that is, for example, a local network, intranet, virtual private network, or other data network used by an organization. The network 202 can include networking hardware such as cables, wireless access points, routers, gateways, firewalls, etc., that work together to allow resident machines hosted device 204 to communicate with other machines hosted device 204 and with computing resources outside of the network 202. The machines hosted device 204 can include, but are not limited to, personal computers, servers, and mobile devices.

Operations of the network 202 and hosted devices 204 may come under attack from malicious actors—users and/or automated services that seek to exploit computing resources they do not own or have authorization to use. The system 200 can be configured to provide monitoring functionality that generates data based on the activity on the network—including malicious activity. This monitoring can then be provided to a security analysts that is tasked with stopping or attempt to stop these attacks through various types of security responses and/or used by automated systems of the data network 202 that take actions to reduce or eliminate the threat from the attack.

When the hosted devices 204 participate in data transmission on the network 202, an array of network security sensors 206 can sense the network activity and generate data for one or more events that represent the activity. For example, the sensors 206 can be connected to the physical layer of the network (e.g., wires, wireless data transmissions) and be configured to respond when signals indicate that network activity is happening. The sensors 206 can respond to this sensing by creating data even when the sensed activity is not addressed to or involve the sensors 206. Depending on the size and scale of the network 202, one array of network sensors 206 may have more or fewer sensors than another array of network sensors. In various examples, hundreds, thousands, tens of thousands, or hundreds of thousands of sensors can be used, although more or fewer are possible.

Based on the event objects, one or more security mechanisms can be engaged. For example, an alert can be generated when the sensors sense events that match one or more rules that define malicious or potentially malicious behavior on the network. In some cases, these alerts are communicated to a human user. In some cases, the data network 202 is configured to perform one or more security actions based on the alert to reduce the impact of a security threat that caused the operations of the data network 202 recorded in the new event object. These security actions can include, but are not limited to quarantining one of the hosted devices 204, logging data messages of one of the hosted devices 204, and applying packet analysis to data messages of one of the hosted devices 204.

Other elements of the system 200 can be used when generating these alerts. For example, an event datastore 208 includes hardware and software used to store event objects created with the sensors 206. The event datastore 208 can include facilities to store data, to receive queries (both related to security operations and types of queries), and to answer a query. The event datastore 208 can include, for example, a bulk memory 210 can be used to store large amounts of data, but at the cost of responsiveness. An access cache 212 with greater responsiveness can be used in conjunction with the bulk memory 212 to reduce the time needed to access some of the data in the bulk memory 210 by keeping a copy of recently accessed data. In addition, a security cache 214 can be used to keep copies of security data, including both data that is also in the bulk memory 210 and other data not found in the bulk memory 214. In such a configuration, the bulk memory 210 can, compared to the security cache 214, have slower access time and greater storage capacity. In addition, the access-cache 212 can be configured to hold results of recent queries for a temporary amount of time and at a faster access time than the bulk memory 210. In such a case, the event datastore 208 can be configured to respond to new queries to the bulk memory 210 with results from the access cache 212 when the access cache 212 stores data responsive to the new queries. Nevertheless, in many enterprise organizations, the event bulk memory 210 may only be able to store its data for a short amount of time (e.g., days or weeks) while the security cache 214 is able to store its data for much longer periods of time (e.g., months or years). This is due to the volume of data being stored in each. As the data network 202 operates, very many events are being created. Comparatively, much less data needs to be stored in the security cache 214 over the same period of time due to the advantageous arrangement of the components of system 200. In this way, longer time periods of data storage for security data may be provided to security analysts even when other data cannot be maintained for as long.

A rules scheduler 210 can monitor a clock to run scheduled rules. However, instead of running the rule itself, the rules scheduler 216 can generate a request to run the rule and push the request to a rule queue 218. The rule queue can store this request, along with other requests not yet run, in an ordered list. This asynchronous communication with the queue can advantageously allow for a more flexible and adaptive computing system than, for example, a monolithic system with synchronous communication. As will be understood, synchronous communication involves various components waiting for a communication partner to communicate with at the same time. This can lead to significant problems. Notably, this technology is provided to solve problems when event data is communicated with delays and out of order. Therefore, the technical solution to this problem can advantageously be provided with internal mechanisms such as the queues that avoid creating more of the issues to be solved, namely avoiding issues around internal communications that are not ordered and timely. As such, the technology described here overcomes many problems related to data communication in very large networks, without introducing the very problems it is meant to solve.

In some cases, this list in the queue can be purely chronological where the oldest request is always the first served. In some cases, this list is a priority queue where a request with the highest priority is served first. The priority may be explicitly recorded in each request. For example, a rule may have a static value or formula to determine a priority value, and that value can be recorded in the request by the rules scheduler 216. The priority may be implicit for each request. For example, the rule queue 218 may determine and update the priority of each request based on data stored in the request (e.g., rule version, number of data objects stored in or referenced by the request) and/or data external to the request (e.g., a status of the data network 202, an analysis of recent alerts generated by the system 200).

Workers 220 in a pool of workers 220 take run requests from the rule queue 218 and run the rule as specified by the request. For example, each worker 220 may be identical virtual machines or hosted applications capable of getting requests from the rule queue 218, parsing the request, requesting referenced event objects from the event datastore 208, determining if the rule is satisfied, and then taking an action specified by the rule if it is satisfied. In some cases, the workers 220 are general-purpose microservice nodes capable of performing a wide variety of operations specified by requests that include the types of analysis described in this document, but also include other types of operations including executing arbitrary scripts referenced in a request on arbitrary data specified by the request. As will be appreciated, the rule queue 218 can carry both the rule requests from the rules scheduler 216 and other types of requests from other schedulers.

The number of workers 220 in the pool of workers 220 can change over time. For example, in response to various factors, an element of the system 200 (e.g., the rules scheduler, a worker-manager not shown) can launch or deactivate workers. Some factors include backlog in the rule queue 218, activity on the network 202, time between generation of a rule request and completion of the run requested, number of alerts generated in a recent amount of time, seasonality (e.g., time of day, day of the week, or time of year), cost of computing resources on which the workers 220 run, downtime of one or more workers 220, etc. This can advantageously be used to solve for the dual technical problems of over-allocated computing resources and unresponsive computer systems. Other systems, without this dynamic load balancing, might need to over-allocate resources so that the static level of resources is always greater than the peak demand. However, such an over-allocation is inefficient because it can lead to allocated resources sitting idle during all but those peak-demand times. On the other hand, allocating based on average demand can result in a system that is unable to maintain responsiveness under those peak-demand times. This technology can advantageously overcome these technical problems.

When a worker 220 runs a rule that calls for an alert (e.g., the rule specifies a complex Boolean test on event object that resolves to true), the worker 220 can generate an alert request. The alert request can include contents specified by the rule such as a reference in the security cache 214 to the event objects analyzed, the identifier and version of the rule, a time-window analyzed, a time of the run, a priority or severity metric, etc. The worker 220 can then place this alert request into an alert queue 222 for use by an alert generator 224. In some cases, the alert queue 222 can operate substantially the same as the rule queue 218 (both queues operating in strictly chronological order, each holding only one type of request, etc.) In some cases, the alert queue 222 and the rule queue 218 can operate differently in one or more ways (e.g., one being a chronological queue while the other is a priority queue, one holding only one type of request while the other holds various types of requests). In some cases, the rule queue 218 and the alert queue 222 can be embodied into a single queue, and the alert generator 224 may be one of the workers 222 that is operating on an alert request instead of a rule run request.

The alert generator 224 can generate and send one or more alerts based on an alert request received from the alert queue 222. For example, the alert generator can create an email, create a text message (e.g., Short Message Service), create a ticket in a task manager, generate a notification in an application running on a hosted device 204, etc. In some examples, the alert can include computer-readable instructions that instruct an element of the network 202 to take a corrective security action.

A display device 226 can render information about the alert in a graphical user interface (GUI) to a user of the display device. For example, the display device 226 can be a laptop computer running an application that generates a notification with information about the alert. When the user selects the notification, a full report of the alert can be rendered on the screen. In some cases, the display device 226 is one of the hosted devices.

Figure 3:
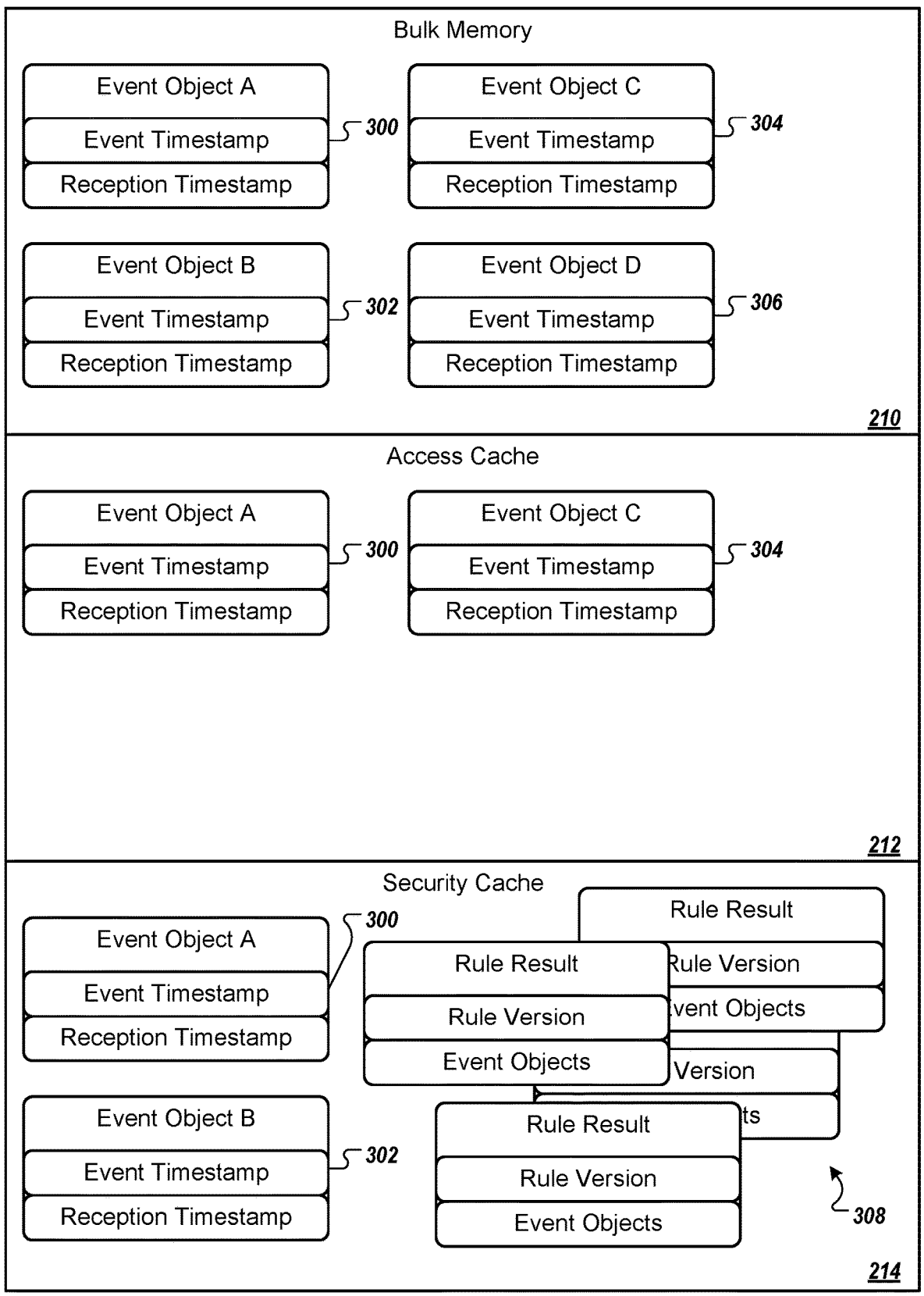
FIG. 3 shows example data usable by security rules.

FIG. 3 shows example data usable by security rules. In this example, data is shown stored in the bulk memory 210, access cache 212, and security cache 214 of the system 200, though in other examples other storage devices and arrangements may be used.

The bulk memory 210 can store, in addition to other data, copies of event data generated by a network security system. Four such event objects 300-306 are show for clarity, but it will be understood that many more event objects may be stored. Generally, the bulk memory 210 can act as a complete storage of all event objects, subject to constraints of storage size or other limitations. Other storage elements may store some, but not all of the event objects 300-306. For example, the access cache 212 may store events 300 and 304 while the security cache 214 may store events 300 and 302.

In some cases, the caches 212 and 214 may store event objects not in the bulk memory 210. In this example, each event object 300-306 can include the same data including both an event timestamp and a reception timestamp that record when an event caused the creation of the event object, and the time at which the event object was received. Other data fields may also be the same across the various storage elements 210-214. However, in other implementations, different copies in different storage elements 210-214 may include or exclude data. For example, the access cache 212 may exclude large files (e.g., Binary Large Objects (BLOBs) or multimedia files). In another example, the event objects 300 and 302 may include a count of the number of times they were accessed by a rule run by a worker, with that count not recorded in the bulk memory.

In addition, the security cache 214 may include other types of data. For example, rule result objects 308 can be stored in the security cache 214 by, for example, a worker 220. In some cases, when a worker 220 completes the run of a rule, a log or other data artifact from the run may be created and submitted to the security cache 214. Later, when the same or a different worker 220 runs a rule, the worker 220 can access a result object 308 as part of running the rule. In one example, a rule may trigger if five event objects meeting a particular criteria are created within a particular window. A worker 220 may run the rule and determine that only four such event objects were created within the time window. Later, a worker 220 (the same or a different worker 220) can run the same rule with a new event object that was received out of order and later than the other mentioned event objects. Instead of accessing the four already-analyzed event objects, the worker 220 may instead query the security cache 214 to see if a log of a previous run of the rule for the time window exists. The security cache 214 can respond by serving the log. The worker 220 can then determine, based on the log and the newly received event object, that the conditions of the event have been met and create an alert request. By recording state information (i.e. the log or artifact) of a rule run, the system can thus advantageously increase operational efficiency when an event object is received out of order and/or after a delay due to, for example, a technical limitation of the system not able to reliably delivery all event objects in order and without variable delay.

Figure 4:
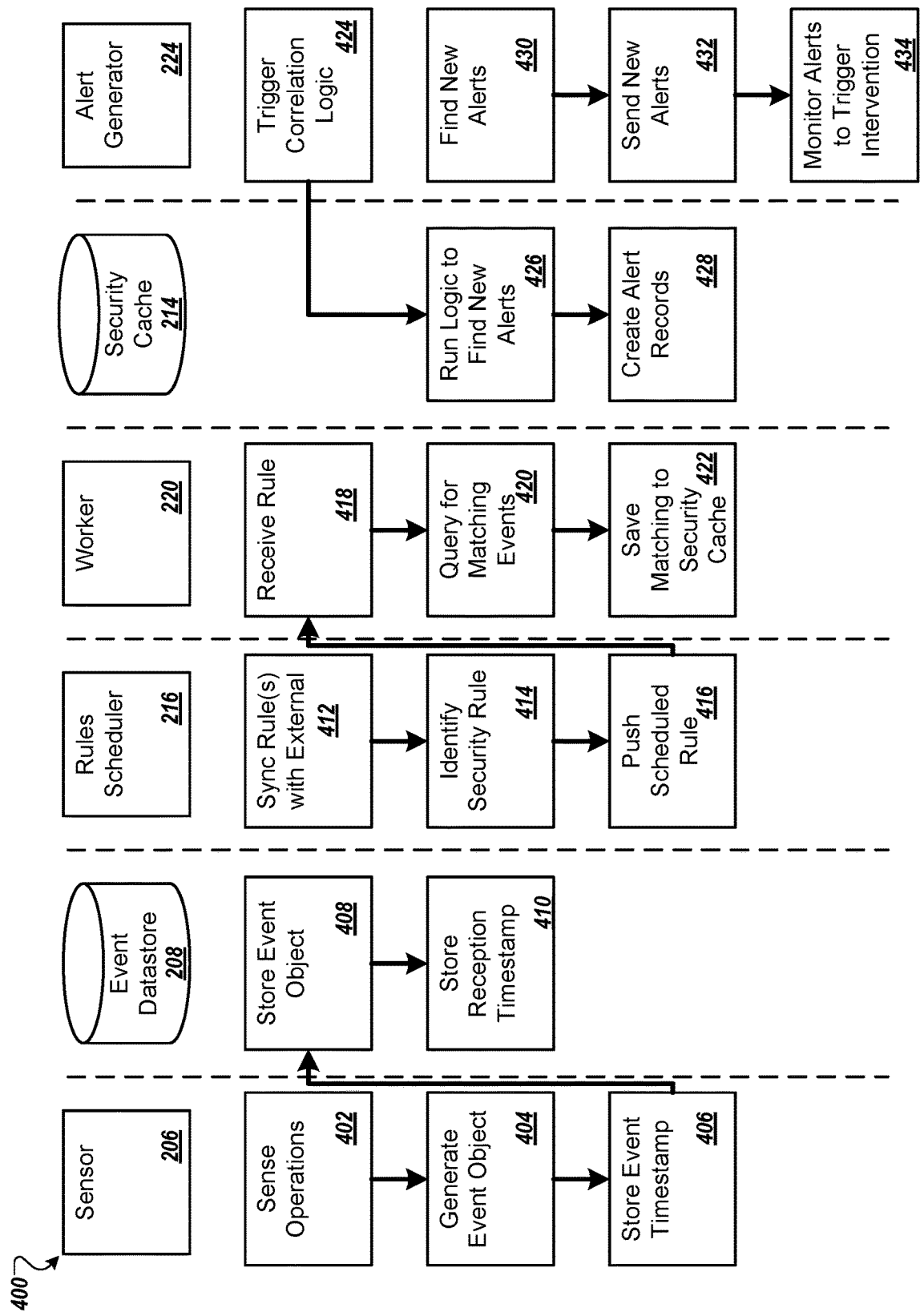
FIG. 4 shows a swimlane diagram of an example process for running a security rule.

FIG. 4 shows a swimlane diagram of an example processes 400 for running a security rule. For example, the process can be run by the system 200 to monitor for malicious attacks or other security issues on the data network 202. Therefore, the example here will be described with references to the system 200. However, the process 400 or a similar process may be performed by other systems.

Network sensors 206 sense 402 operations of the data network 202. For example, the data network 202 may host a hosted device 204 used by a malicious actor attempting to exfiltrate data from the network. In doing so, the actor may command the hosted device 204 to start a transmission of greater than one gigabyte to a remote server (not shown).

Network sensors 206, responsive to sensing 402 the operations of the data network 202, generate 404 event objects that record the operations of the data network. For example, a sensor 206 may sense the packets crated by the hosted device 2204 can create one or more event objects recording information about the packets.

Network sensors 206 store 406, in each event object, an event-timestamp that records a first time at which the operations were sensed. For example, the sensors can timestamp each of the new events with data recorded from an internal clock that each sensor includes, or from an external canonical clock hosted by the data network for this and other uses.

The event datastore 208 stores 408 the event objects in a bulk-memory. For example, the sensors 206 cam send, to the event datastore 208, the new event objects. The event datastore 208 stores 410, for each event object stored in the bulk-memory, a reception-timestamp that records a second time at which the event object was received for storage. For example, the event datastore 208 can decorate the event data objects with a second timestamp. This timestamp may be generated from an internal clock included by the event datastore, or from the same external canonical clock used by the sensors 206.

The rules scheduler 216 synchronizes 412 its stored rules with one or more external sources. For example, the security rules may be generated and updated by security personnel in various system. The rules scheduler 216 can access these rules and update the rule scheduler's 216 stored copy of the rules.

The rules scheduler 216 identifies 414 at least one security-rule to be run, the security-rule specifying a time-length. For example, responsive to determining that a rule has not been run for greater than a threshold period of time, the rules scheduler 216 can identify that rule as in need of running.

The rules scheduler 216 transmits 416 the scheduled rule to a worker 220. For example, the rules scheduler 216 stores, to an operation queue, instructions to run the security rule. If the rule queue 218 is currently empty, this will be the only request in the rule queue 218. However, if the rule queue 218 includes other requests, the rule run request will be held and ordered according to the configuration of the rule queue 218.

The worker 220 identifies 418 the instructions to run the security rule in the operation queue. For example, a worker 220 may, upon completion of a previous task, query the rule queue 218 for the next available rule run request. In another example, an idle worker may periodically poll the rule queue 218 to see if there is an available rule run request (or other type of request, depending on the configuration of the system 200).

The worker 220 queries 420 for matching events. For example, the worker 220 can request, from the security cache 214, stored event objects matching the parameters of the rule, and the security cache 214 can return those queried event objects. In some implementations, the worker 220 can perform calculations and aggregations specified by the rule, and then perform one or more analysis on the calculations and aggregations to produce a rule result. In some examples, a rule may have a Boolean (e.g., True/False) outcome. In some example, a rule may have a scalar (e.g., value between 0 and 1) or other type of result.

The worker 220 saves 422 to the datastore security events matching the rule in the security-cache. For example, the worker 2200 can send to the event datastore 208 a copy of the analyzed event data objects, a log of the operations taken to run the rule, the result of the rule, and/or the interstitial calculations and aggregations discussed previously.

The alert generator can trigger 424 correlation logic and the security cache 214 can run 426 the correlation logic to identify new alerts to be generated. For example, the alert generator 224 can send a message to the security cache 214, through a messaging queue, to run one or more stored programs on the contents of the security cache 214. The security cache 214 can execute the program. The security cache 214 can create 248 alert records. For example, after running the program and identifying that an alert should be generated based on the contents of the rule, the security cache 214 can create records for the alert in the security cache 214.

The alert generator 224 can find 430 new alert records and send 432 new alerts. For example, the alert generator 432 can pole the security cache 214 to identify any new alert records. When a new alert record is identified, the alert generator can create a corresponding alert for transmission in a message queue.

The alert generator 224 can monitor 434 the generation of the alerts to trigger an intervention. For example, the alert generator 224 can keep a count of the number of each type of alert within a previous time window. Should that number reach a threshold value, the alert generator 224 can initiate one or more responsive actions such as pausing the generation of alerts temporarily.

Figure 5:
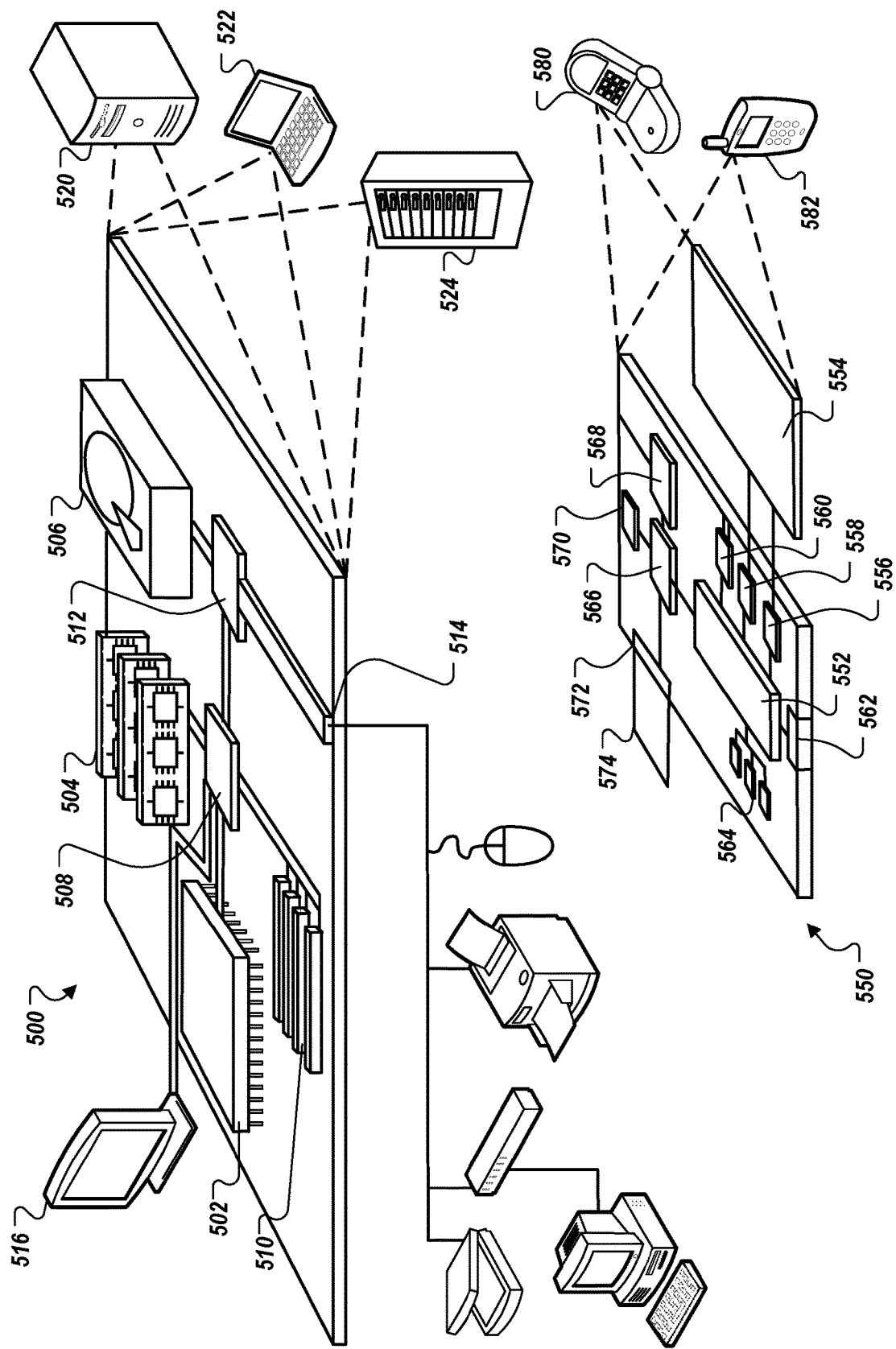
FIG. 5 shows a schematic diagram that shows an example of a computing device and a mobile computing device.

FIG. 5 shows an example of a computing device 500 and an example of a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which can accept various expansion cards (not shown). In the implementation, the low-speed interface 512 is coupled to the storage device 506 and the low-speed expansion port 514. The low-speed expansion port 514, which can include various communication ports (e.g., USB, Bluetooth®, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. In addition, it can be implemented in a personal computer such as a laptop computer 522. It can also be implemented as part of a rack server system 524. Alternatively, components from the computing device 500 can be combined with other components in a mobile device (not shown), such as a mobile computing device 550. Each of such devices can contain one or more of the computing device 500 and the mobile computing device 550, and an entire system can be made up of multiple computing devices communicating with each other.

The mobile computing device 550 includes a processor 552, a memory 564, an input/output device such as a display 554, a communication interface 566, and a transceiver 568, among other components. The mobile computing device 550 can also be provided with a storage device, such as a micro-drive or other device, to provide additional storage. Each of the processor 552, the memory 564, the display 554, the communication interface 566, and the transceiver 568, are interconnected using various buses, and several of the components can be mounted on a common motherboard or in other manners as appropriate.

The processor 552 can execute instructions within the mobile computing device 550, including instructions stored in the memory 564. The processor 552 can be implemented as a chipset of chips that include separate and multiple analog and digital processors. The processor 552 can provide, for example, for coordination of the other components of the mobile computing device 550, such as control of user interfaces, applications run by the mobile computing device 550, and wireless communication by the mobile computing device 550.

The processor 552 can communicate with a user through a control interface 558 and a display interface 556 coupled to the display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which can include, for example, a SIMM (Single In Line Memory Module) card interface. The expansion memory 574 can provide extra storage space for the mobile computing device 550, or can also store applications or other information for the mobile computing device 550. Specifically, the expansion memory 574 can include instructions to carry out or supplement the processes described above, and can include secure information also. Thus, for example, the expansion memory 574 can be provide as a security module for the mobile computing device 550, and can be programmed with instructions that permit secure use of the mobile computing device 550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 can communicate wirelessly through the communication interface 566, which can include digital signal processing circuitry where necessary. The communication interface 566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 568 using a radio-frequency. In addition, short-range communication can occur, such as using a Bluetooth®, WiFi®, or other such transceiver (not shown). In addition, a GPS (Global Positioning System) receiver module 570 can provide additional navigation- and location-related wireless data to the mobile computing device 550, which can be used as appropriate by applications running on the mobile computing device 550.

The mobile computing device 550 can also communicate audibly using an audio codec 560, which can receive spoken information from a user and convert it to usable digital information. The audio codec 560 can likewise generate audible sound for a user, such as through a speaker, e.g., in a handset of the mobile computing device 550. Such sound can include sound from voice telephone calls, can include recorded sound (e.g., voice messages, music files, etc.) and can also include sound generated by applications operating on the mobile computing device 550.

The mobile computing device 550 can be implemented in a number of different forms, as shown in the figure. For example, it can be implemented as a cellular telephone 580. It can also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer system for execution of security rules on a data network, the computer system comprising:
   a data network configured to pass data messages between hosted devices;
   a plurality of network sensors configured to:
      sense operations of the data network;
      responsive to sensing the operations of the data network, generate event objects that record the operations of the data network; and
      store, in each event object, an event-timestamp that records a first time at which the operations were sensed;
   a datastore configured to:
      store the event objects in a bulk-memory;
      store, for each of the event objects stored in the bulk-memory, a reception-timestamp that records a second time at which the event object was received for storage;
   a rules-scheduler configured to:
      identify at least one security-rule to be run, the at least one security-rule specifying a time-length;
      identify a time-window having a beginning-time before the event-timestamp and an end-time after the event-timestamp;
      identify matching event objects;
      cause the at least one security-rule to be run on the matching event objects that i) each have an event timestamp after the beginning-time and before the end-time and ii) are each associated with the at least one security-rule;
   an alert generator configured to:
      generate an alert based on the run of the at least one security-rule on the matching event objects;
   a display-device configured to:
      render information about the alert in a graphical user interface (GUI) to a user of the display-device; and
   wherein:
      the data network is further configured to perform one or more security actions based on the alert to reduce an impact of a security threat that caused the operations of the data network being recorded in a new event object; and
      the data network, the plurality of network sensors, the datastore, the rules-scheduler, the alert generator and the display-device are all being implemented by their respective hardware.

2. The computer system of claim 1, wherein:
   to cause the at least one security-rule to be run on the matching event objects, the rules-scheduler is further configured to:

store, to an operation queue, instructions to run the at least one security-rule on the matching event objects; and the system further comprises a plurality of rule-workers, implemented by one or more hardware, each rule-worker configured to:
identify the instructions to run the at least one security-rule in the operation queue;
access, from a security-cache, event objects that i) each have an event timestamp after the beginning-time and before the end-time and ii) are each associated with the at least one security-rule;
run the at least one security-rule on the accessed event objects; and
cause the alert with information about the run of the security rule on the new event object and on additional event objects to be created.

3. The computer system of claim 2, wherein:
to cause the alert with information about the run of the security rule on matching objects to be created, each rule-worker is configured to:
instruct an event generator to generate an event based on the run of the security rule on the matching event objects; and
the alert generator is further configured to:
receive an instruction to generate the alert based on the run of the security rule on the matching event objects;
determine if a duplicate alert was already created; and
responsive to determining that the duplicate alert was not already created, generating and transmitting the alert with information about the run of the at least one security-rule on the new event object and on the additional event objects.

4. The computer system of claim 2, wherein:
the bulk-memory, compared to the security-cache, has slower access time and has greater storage capacity;
the bulk-memory comprises an access-cache separate from the security-cache, the access-cache configured to hold results of recent queries for a temporary amount of time and at a faster access time than the bulk-memory; and
the datastore is further configured to respond to new queries to the bulk-memory with results from the access-cache when the access-cache stores data responsive to the new queries.

5. The computer system of claim 1, wherein the one or more security actions includes at least one action to be performed from a group consisting of i) quarantining one of the hosted devices, ii) logging the data messages of one of the hosted devices, and iii) applying packet analysis to the data messages of one of the hosted devices.

6. A method for execution of security rules on a data network, the method comprising:
passing data messages between hosted devices;
sensing operations of the data network;
responsive to sensing the operations of the data network, generating event objects that record the operations of the data network;
storing, in each event object, an event-timestamp that records a first time at which the operations were sensed;
storing the event objects in a bulk-memory;
storing, for each of the event objects stored in the bulk-memory, a reception-timestamp that records a second time at which the event object was received for storage;
identifying at least one security-rule to be run, the at least one security-rule specifying a time-length;
identifying a time-window having a beginning-time before the event-timestamp and an end-time after the event-timestamp;
identifying matching event objects;
causing the at least one security-rule to be run on the matching event objects that i) each have an event timestamp after the beginning-time and before the end-time and ii) are each associated with the at least one security-rule;
generating an alert based on the run of the at least one security-rule on the matching event objects;
rendering information about the alert in a graphical user interface (GUI) to a user of a display-device; and
performing one or more security actions based on the alert to reduce an impact of a security threat that caused the operations of the data network being recorded in a new event object.

7. The method of claim 6, wherein causing the at least one security-rule to be run on the matching event objects comprises:
storing, to an operation queue, instructions to run the at least one security-rule on the matching event objects; and
identifying the instructions to run the at least one security-rule in the operation queue;
accessing, from a security-cache, event objects that i) each have an event timestamp after the beginning-time and before the end-time and ii) are each associated with the security-rule; running the security rule on the accessed event objects; and
causing the alert with information about the run of the at least one security-rule on the new event object and on additional event objects to be created.

8. The method of claim 7, wherein:
causing the alert with information about the run of the at least one security-rule on matching objects to be created comprises:
generating an event based on the run of the at least one security-rule on the matching event objects;
receiving an instruction to generate the alert based on the run of the at least one security-rule on the matching event objects;
determining if a duplicate alert was already created; and
responsive to determining that the duplicate alert was not already created, generating and transmitting the alert with information about the run of the at least one security-rule on the new event object and on the additional event objects.

9. The method of claim 7, wherein:
the bulk-memory, compared to the security-cache, has slower access time and has greater storage capacity;
the bulk-memory comprises an access-cache separate from the security-cache, the access-cache configured to hold results of recent queries for a temporary amount of time and at a faster access time than the bulk-memory; and
responding to new queries to the bulk-memory with results from the access-cache when the access-cache stores data responsive to the new queries.

10. The method of claim 6, wherein the one or more security actions includes at least one action to be performed from a group consisting of i) quarantining one of the hosted devices, ii) logging the data messages of one of the hosted devices, and iii) applying packet analysis to the data messages of one of the hosted devices.

11. A non-transitory computer-readable media tangibly storing instructions that, when executed by one or more processors, cause the one or more processors to perform method steps comprising:
   passing data messages between hosted devices;
   sensing operations of a data network;
   responsive to sensing the operations of the data network, generating event objects that record the operations of the data network;
   storing, in each event object, an event-timestamp that records a first time at which the operations were sensed;
   storing the event objects in a bulk-memory;
   storing, for each of the event objects stored in the bulk-memory, a reception-timestamp that records a second time at which the event object was received for storage;
   identifying at least one security-rule to be run, the at least one security-rule specifying a time-length;
   identifying a time-window having a beginning-time before the event-timestamp and an end-time after the event-timestamp;
   identifying matching event objects:
   causing the at least one security-rule to be run on the matching event objects that i) each have an event timestamp after the beginning-time and before the end-time and ii) are each associated with the at least one security-rule;
   generating an alert based on the run of the at least one security-rule on the matching event objects;
   rendering information about the alert in a graphical user interface (GUI) to a user of a display-device; and
   performing one or more security actions based on the alert to reduce an impact of a security threat that caused the operations of the data network being recorded in a new event object.

12. The non-transitory computer-readable media of claim 11, wherein causing the at least one security-rule to be run on the matching event objects comprises:
   storing, to an operation queue, instructions to run the at least one security-rule on the matching event objects; and
   identifying the instructions to run the at least one security-rule in the operation queue;
   accessing, from a security-cache, event objects that i) each have an event timestamp after the beginning-time and before the end-time and ii) are each associated with the security-rule; running the security rule on the accessed event objects; and
   causing the alert with information about the run of the at least one security-rule on the new event object and on additional event objects to be created.

13. The non-transitory computer-readable media of claim 12, further comprising:
   causing the alert with information about the run of the at least one security-rule on matching objects to be created comprises:
      generating an event based on the run of the at least one security-rule on the matching event objects;
   receiving an instruction to generate the alert based on the run of the at least one security-rule on the matching event objects;
   determining if a duplicate alert was already created; and
   responsive to determining that the duplicate alert was not already created, generating and transmitting the alert with information about the run of the at least one security-rule on the new event object and on the additional event objects.

14. The non-transitory computer-readable media of claim 12, further comprising:
   wherein:
      the bulk-memory, compared to the security-cache, has slower access time and has greater storage capacity; and
      the bulk-memory comprises an access-cache separate from the security-cache, the access-cache configured to hold results of recent queries for a temporary amount of time and at a faster access time than the bulk-memory; and responding to new queries to the bulk-memory with results from the access-cache when the access-cache stores data responsive to the new queries.

15. The non-transitory computer-readable media of claim 11, wherein the one or more security actions includes at least one action to be performed from a group consisting of i) quarantining one of the hosted devices, ii) logging the data messages of one of the hosted devices, and iii) applying packet analysis to the data messages of one of the hosted devices.

* * * * *